(No Model.)

L. MESSIER.
MEANS FOR HAULING RAILWAY CARS.

No. 364,033. Patented May 31, 1887.

Witnesses:
S. B. Bruner
W. M. Brown

Inventor:
Luke Messier,
by William H. Low,
Attorney.

United States Patent Office.

LUKE MESSIER, OF SCHENECTADY, NEW YORK.

MEANS FOR HAULING RAILWAY-CARS.

SPECIFICATION forming part of Letters Patent No. 364,033, dated May 31, 1887.

Application filed May 1, 1886. Serial No. 200,775. (No model.)

*To all whom it may concern:*

Be it known that I, LUKE MESSIER, of the city and county of Schenectady, in the State of New York, have invented new and useful Improvements in Means for Hauling Railway-Cars, of which the following is a specification.

My invention relates to an apparatus for hauling railway-cars by means of a stationary power on tracks adjoining to or in the neighborhood of the place where the power is located.

The object of my invention is to provide mechanical means for moving cars to and from the store-houses, mills, and factories without the aid of locomotive or manual power commonly employed for that purpose. This object I attain by means of the mechanism illustrated in the accompanying drawings, which are herein referred to and form part of this specification, and in which—

Figure 1:
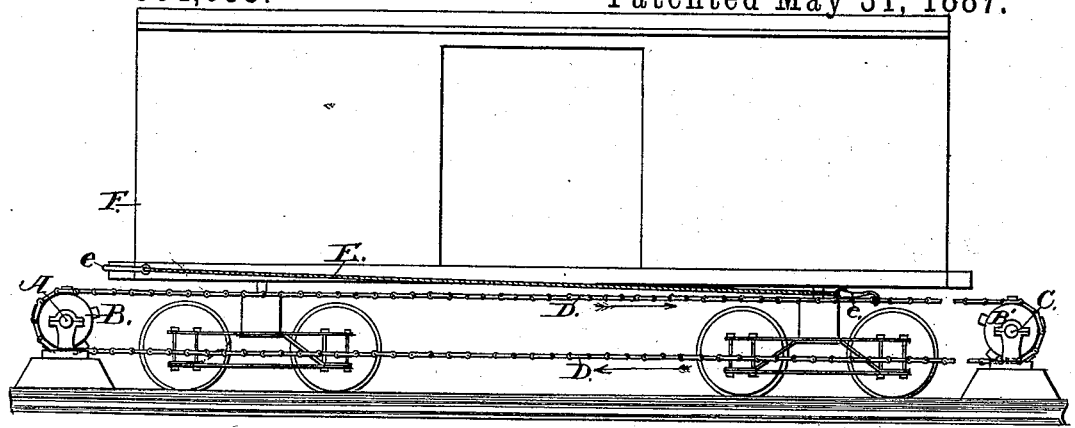
Figure 2:
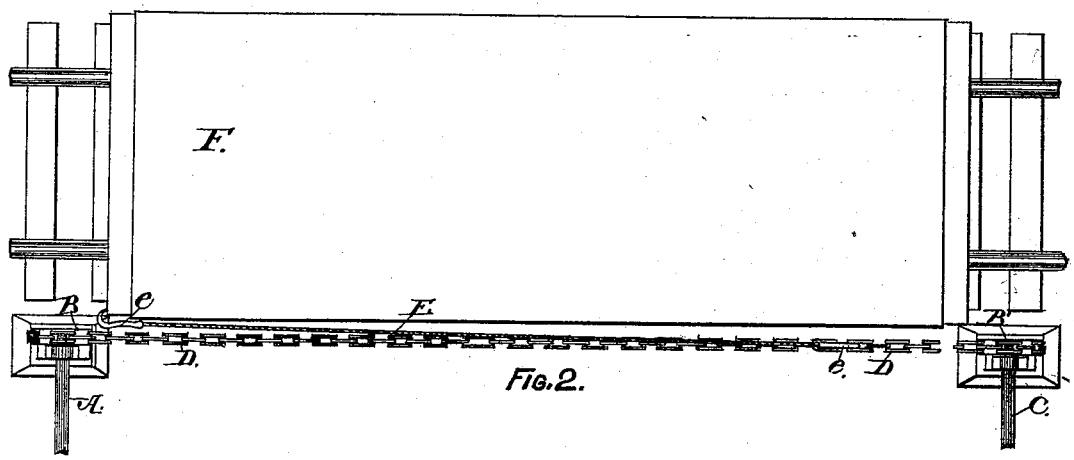

Figure 1 is a side elevation, and Fig. 2 a plan view, of my invention.

As represented in the drawings, A is the driving-shaft, provided with the sprocket-wheel B, and which derives its motion from any suitable motive power. The motion of said shaft may be constant, when preferred, or intermittent, by means of any of the common and well-known means employed for such purposes.

C is a driven shaft, located at any required distance from the shaft A, and provided with a sprocket-wheel, B'; D, an endless chain passing around the sprocket-wheels B and B' and kept in motion by the driving-shaft A; E, a rope or chain provided with hooks $e$ at each end, one of said hooks being adapted to engage in the endless chain D, and the other hook, or any equivalent device, being adapted to engage on or with any part of the car F.

The operation of my apparatus is as follows: The endless chain D being in motion, during which it is obvious that its upper and lower stretches will move in contrary directions, as indicated by arrows in Fig. 1, and one end of the rope E being attached to the car F, the hook $e$ is dropped into one of the open links of the endless chain D, which, as soon as any slack in the rope E is taken up by the movement of the endless chain, will cause the car to move along the rails; and the car can be moved in one direction by engaging the hook $e$ in the upper stretch of the endless chain, and in the reverse direction by engaging said hook in the lower stretch of said chain.

By using a rope, E, of sufficient length, cars may be moved on tracks that are parallel or nearly parallel to the line of the endless chain D, but at a considerable distance therefrom; and by running said rope around guide-pulleys, so as to change the direction in which it runs, cars may be moved on tracks which run at an angle in respect to the line of movement of the endless chain.

I claim as my invention—

In an apparatus for moving cars on railway-tracks, the combination, with an open-link endless chain which is constantly moved in one direction and a sprocket-wheel, B, that is rotated by a stationary and positive motive power, of a detachable rope, E, provided with hooks $e$ at both ends, one of said hooks being adapted to engage with a car, F, and the other hook being fitted to engage in a link of the endless chain D while the latter is in motion, as and for the purpose herein specified.

LUKE MESSIER.

Witnesses:
WM. H. LOW,
S. B. BREWER.